United States Patent
Solis Herrera

(10) Patent No.: US 11,432,572 B2
(45) Date of Patent: Sep. 6, 2022

(54) ELECTROCHEMICAL PROCESS AND SYSTEM FOR THE PRESERVATION OF PERISHABLE FOOD

(71) Applicant: Arturo Solis Herrera, Aguascalientes (MX)

(72) Inventor: Arturo Solis Herrera, Aguascalientes (MX)

( * ) Notice: Subject to any disclaimer, the term of this patent is extended or adjusted under 35 U.S.C. 154(b) by 345 days.

(21) Appl. No.: 15/308,204

(22) PCT Filed: May 6, 2015

(86) PCT No.: PCT/IB2015/000650
§ 371 (c)(1),
(2) Date: Nov. 1, 2016

(87) PCT Pub. No.: WO2015/170161
PCT Pub. Date: Nov. 12, 2015

(65) Prior Publication Data
US 2017/0055556 A1    Mar. 2, 2017

Related U.S. Application Data

(60) Provisional application No. 61/989,013, filed on May 6, 2014.

(51) Int. Cl.
| | |
|---|---|
| A23L 3/26 | (2006.01) |
| A23L 3/28 | (2006.01) |
| A23L 3/3544 | (2006.01) |
| A23L 3/3409 | (2006.01) |
| A23L 3/32 | (2006.01) |
| C25B 1/04 | (2021.01) |

(52) U.S. Cl.
CPC ............. *A23L 3/26* (2013.01); *A23L 3/28* (2013.01); *A23L 3/325* (2013.01); *A23L 3/3409* (2013.01); *A23L 3/3544* (2013.01); *C25B 1/04* (2013.01); *A23V 2002/00* (2013.01); *Y02E 60/36* (2013.01)

(58) Field of Classification Search
CPC ........ A23L 3/26; A23L 3/3409; A23L 3/3544; A23L 3/325; A23L 3/28; C25B 1/04; C25B 1/55; A23V 2002/00; Y02E 60/366
USPC ................................................ 204/157.52
See application file for complete search history.

(56) References Cited

U.S. PATENT DOCUMENTS

| | | | |
|---|---|---|---|
| 3,937,847 A | 2/1976 | Elkins et al. | |
| 4,871,559 A | 10/1989 | Dunn et al. | |
| 6,010,727 A * | 1/2000 | Rosenthal | A23L 2/50 426/240 |
| 7,115,297 B2 * | 10/2006 | Stillman | A23L 2/38 426/590 |
| 8,455,145 B2 | 6/2013 | Solis Herrera | |
| 8,496,885 B2 * | 7/2013 | Offord | B29C 49/04 422/211 |
| 2002/0194852 A1 | 12/2002 | Furuta et al. | |
| 2005/0244556 A1 | 11/2005 | Karren | |
| 2006/0078653 A1 * | 4/2006 | Lin | A23L 3/00 426/106 |
| 2007/0166438 A1 * | 7/2007 | Kitahata | B01J 20/103 426/242 |
| 2007/0212459 A1 | 9/2007 | Beelman et al. | |
| 2009/0134007 A1 * | 5/2009 | Solis Herrera | C25B 1/003 204/157.5 |
| 2012/0114529 A1 * | 5/2012 | Carmichael | B65D 51/244 422/105 |
| 2013/0101714 A1 * | 4/2013 | Buehler | A47J 44/00 426/416 |
| 2013/0288144 A1 | 10/2013 | Solis Herrera | |
| 2013/0337121 A1 * | 12/2013 | Sugano | A23B 4/015 426/232 |
| 2014/0348702 A1 * | 11/2014 | Wofford | A61L 2/20 422/29 |
| 2016/0151525 A1 * | 6/2016 | Kleinberger | A61L 2/035 422/29 |

(Continued)

FOREIGN PATENT DOCUMENTS

| | | |
|---|---|---|
| CN | 101228297 A | 7/2008 |
| CN | 102361802 A | 2/2012 |

(Continued)

OTHER PUBLICATIONS

Office Action dated Jan. 17, 2018 in RU Application No. 2016147359.

(Continued)

*Primary Examiner* — Nicholas A Smith
(74) *Attorney, Agent, or Firm* — Panitch Schwarze Belisario & Nadel LLP

(57) ABSTRACT

Electrochemical processes and systems for preserving perishable food are described. The process and system allow for the preservation of perishable food in the presence of water moisture, melanin, or a precursor, derivative, analog, or variant of melanin, and electromagnetic energy, such as visible or invisible light energy. There exists a need in the art for improved methods and processes for preserving perishable foods that overcome certain disadvantages associated with known methods for preserving perishable food, such as addition of preservatives, refrigeration/freezing, drying/dehydration of food, and storage under vacuum. The invention satisfies this need by providing a process and system for preserving perishable food in the presence of water moisture, electromagnetic energy, and melanin, melanin precursors, melanin derivatives, melanin analogs, or melanin variants.

11 Claims, No Drawings

(56) References Cited

U.S. PATENT DOCUMENTS

2017/0360070 A1* 12/2017 Jung .................... A23L 3/3445

FOREIGN PATENT DOCUMENTS

| GB | 710979 | A | 6/1954 |
|----|--------|---|--------|
| JP | H09187221 | A | 7/1997 |
| JP | 2004323815 | A | 11/2004 |
| JP | 2011016101 | A | 1/2011 |
| JP | 4909346 | B2 | 4/2012 |
| RU | 2500430 | C1 | 12/2013 |
| WO | 2004058210 | A1 | 7/2004 |
| WO | 2010116194 | A1 | 10/2010 |

OTHER PUBLICATIONS

Int'l Search Report dated Oct. 13, 2015 in Int'l Application No. PCT/IB2015/000650.

Hong et al., "Hydrogen as a Selective Antioxidant: A Review of Clinical and Experimental Studies" J Int. Med. Res., vol. 38, pp. 1893-1903 (2010).

Liu et al., "Hydrogen: From a Biologically Inert Gas to a Unique Antioxidant," Oxidative-Stress-Molecular Mechanisms and Biological Effects Chapter 8, pp. 135-144 (2012).

Examination Report dated Feb. 14, 2017 in AU Application No. 2015257443.

Extended Search Report dated Nov. 29, 2017 in EP Application No. 15789363.7.

Office Action dated Nov. 7, 2017 in JP Application No. 2016566756.

Office Action dated Dec. 15, 2017 in CA Application No. 2948285.

Office Action dated Apr. 3, 2019 in CN Application No. 201580023173.8.

Office Action dated Apr. 12, 2019 in NZ Application No. 725776.

Office Action dated Feb. 12, 2020 in EP Application No. 15789363.7.

Hu et al., "Hydrogen-rich water delays postharvest ripening and senescence of kiwifruit," Food Chemistry, vol. 156, pp. 100-109 (2014).

Office Action dated Jan. 15, 2020 in CN Application No. 201580023173.8.

Office Action dated Sep. 11, 2019 in CN Application No. 201580023173.8.

Office Action dated Sep. 30, 2019 in IN Application No. 201617037820.

Office Action dated Oct. 29, 2019 in BR Application No. 112016025811-8.

Office Action dated Apr. 27, 2020 in CN Application No. 201580023173.8.

Office Action dated Aug. 17, 2020 in MX Application No. MX/a/2016/014500.

Office Action dated Feb. 23, 2021 in MX Application No. MX/a/2016/014500.

* cited by examiner

ELECTROCHEMICAL PROCESS AND SYSTEM FOR THE PRESERVATION OF PERISHABLE FOOD

CROSS-REFERENCE TO RELATED APPLICATIONS

This application is a Section 371 of International Application No. PCT/IB2015/000650, filed May 6, 2015, which was published in the English language on Nov. 12, 2015 under International Publication No. WO 2015/170161 A1, which claims priority under 35 U.S.C. § 119(e) to U.S. Provisional Patent Application No. 61/989,013, filed May 6, 2014, and the disclosures of which are herein incorporated by reference.

FIELD OF THE INVENTION

The invention relates to processes and systems for preserving perishable food.

BACKGROUND OF THE INVENTION

Food spoilage is the process by which food deteriorates to a point at which it is no longer edible, or suitable for consumption by humans. Food capable of spoiling is known as perishable food, and common examples of perishable food include fruits and vegetables. Many different factors can cause food spoilage, or affect the rate at which food spoils, such as oxidation, enzymatic degradation, temperature, moisture, and microorganisms (e.g., bacteria, mold, yeast). Thus, methods for preventing, reducing, or delaying food spoilage attempt to counteract one or more of these factors. Such methods include the addition of preservatives, refrigeration/freezing, drying/dehydration of food, and storage under vacuum (e.g., canning). Because exposure to oxygen and sunlight are two of the main sources of food oxidation, food is often also stored in the dark to reduce sunlight exposure, or sealed in wax or other protective coating to reduce exposure to oxygen in the air, to further reduce food spoilage.

However, the aforementioned methods of food preservation have some limitations. More specifically, the addition of preservatives can change the flavor of the food, and depending on the particular preservative added, can also introduce chemicals into food that may cause adverse effects when consumed. Moreover, refrigeration, freezing, dehydration, and canning can only preserve food for a limited amount of time before either the food begins to spoil, or the quality and flavor of the food deteriorates to a point at which one no longer wants to consume it, even though the food may not have spoiled and is thus still safe for human consumption. Additionally, oxidation of food can still readily occur in food that is refrigerated or frozen. There is also the problem of food discoloration.

Thus, antioxidants have also been used as additives to prevent or delay food spoilage. Antioxidants are molecules that inhibit the oxidation of other substances or molecules. Antioxidants used as additives for food preservation include both natural antioxidants, such as ascorbic acid, retinols, bioflavonoids, and tocopherols, and synthetic antioxidants, such as butylated hydroxytoluene and butylated hydroxyanisole. However, the safety of synthetic antioxidants has been called into question.

Recently, diatomic hydrogen ($H_2$) has been shown to have antioxidant properties. It has also been shown to act as a scavenger of reactive oxygen species (ROS). See, e.g., Hong et al. "Hydrogen as a Selective Antioxidant: A Review of Clinical and Experimental Studies" *J. Int. Med. Res.* 38: 1893-1903 (2010); and Shulin Liu, Xuejun Sun, and Hengyi Tao "Hydrogen: From a Biologically Inert Gas to a Unique Antioxidant," *Oxidative-Stress-Molecular Mechanisms and Biological Effects* Chapter 8, pages 135-133 (2012), edited by Dr. Volodymyr Lushchak ISBN: 978-953-51-0554-1, InTech. However, to the best of the knowledge of the inventor, the use of $H_2$ in food preservation has not yet been explored.

The intrinsic ability of the pigment melanin to absorb energy and utilize the absorbed energy to catalyze the electrolysis of water into hydrogen and oxygen was also recently discovered. In particular, it was found that upon splitting of the water molecule by melanin, the reverse reaction can occur, consequently reforming the water molecule and releasing energy. Thus, melanin absorbs all wavelengths of electromagnetic energy, including visible and invisible light energy, and dissipates this absorbed energy by means of water dissociation and its consequent reformation. A photoelectrochemical process for generating energy using melanin, or analogs, precursors, derivatives, or variants of melanin is described in U.S. Pat. No. 8,455,145.

Melanin is ubiquitous in nature, and is composed of nitrogen, oxygen, hydrogen and carbon. For many years, melanin had no biological or physiological function attributed to it, other than it being considered a simple sunscreen with a low protection factor equivalent to that of a 2% copper sulfate solution. Melanin has also been considered the darkest molecule known because it is able to absorb energy of almost any wavelength, yet it did not seem to emit any energy. This was unique to melanin, and it contradicted thermodynamic laws because other compounds capable of absorbing energy, particularly pigments, emit a portion of the energy absorbed. The electronic properties of melanin have thus been the focus of attention for quite some time. However, melanin is one of the most stable compounds known to man and, for a long time, it seemed that melanin was unable to catalyze any chemical reaction.

Without wishing to be bound by any theories, for example, it is believed that the reaction inside melanin occurs according to the following Scheme I:

(I)

Upon the absorption of electromagnetic energy such as light energy (visible or invisible), melanin catalyzes the dissociation of water into diatomic hydrogen ($H_2$), diatomic oxygen ($O_2$), and electrons (e). Although the splitting of water into hydrogen and oxygen consumes energy, the reaction is reversible, and in the reverse process the reduction of oxygen atoms with diatomic hydrogen to reform the water molecules liberates energy, as discussed above.

Thus, melanin is able to transform light energy into chemical energy, analogous to the process by which plants use the pigment chlorophyll to transform light energy into chemical energy during photosynthesis. Therefore, by analogy, this process has been designated "human photosynthesis." However, an important distinction between the water splitting reaction carried out by melanin and that carried out by chlorophyll is that the water splitting reaction by chlorophyll can only occur in a living cell and with visible light having a wavelength in the range of 400 nm to 700 nm. In contrast, melanin can split and reform the water molecule outside of a living cell using any form of electromagnetic energy, particularly with light energy (visible or invisible) having a wavelength in the range of 200 nm to 900 nm to form $H_2$ and $O_2$.

BRIEF SUMMARY OF THE INVENTION

There exists a need in the art for improved methods and processes for preserving perishable foods that overcome certain disadvantages associated with known methods for preserving perishable food, such as addition of preservatives, refrigeration/freezing, drying/dehydration of food, and storage under vacuum. The invention satisfies this need by providing a process and system for preserving perishable food in the presence of water moisture, electromagnetic energy, and melanin, melanin precursors, melanin derivatives, melanin analogs, or melanin variants.

In one general aspect, the invention relates to an electrochemical process for preserving at least one perishable food. According to embodiments of the invention, the process comprises:
  providing a closed container containing water moisture, the at least one perishable food, and at least one water electrolyzing device, wherein the at least one water electrolyzing device comprises a substrate and at least one melanin material selected from the group consisting of melanin, melanin precursors, melanin derivatives, melanin analogs, and melanin variants;
  providing a source of electromagnetic energy to the at least one water electrolyzing device in the container to initiate a reaction of water electrolysis by the at least one melanin material; and
  maintaining the at least one perishable food and water electrolyzing device within the container, such that the at least one perishable food is preserved.

In one preferred embodiment, the source of electromagnetic energy comprises invisible or visible light energy having a wavelength of 200 nm to 900 nm. In another preferred embodiment, the melanin material comprises natural melanin or synthetic melanin.

In another general aspect, the invention relates to a system for preserving at least one perishable food. According to embodiments of the invention, the system comprises:
  (a) a closed container containing:
    (i) water moisture;
    (ii) at least one water electrolyzing device, wherein the at least one water electrolyzing device comprises a substrate and at least one melanin material selected from the group consisting of melanin, melanin precursors, melanin derivatives, melanin analogs, and melanin variants; and
    (iii) the least one perishable food; and
  (b) a source of electromagnetic energy to irradiate the water electrolyzing device in the container.

Although the exact mechanism by which the perishable food is preserved is not known, it is believed that the water electrolysis reaction catalyzed by melanin upon the irradiation with electromagnetic energy as previously described in U.S. Pat. No. 8,455,145, for example, produces diatomic hydrogen ($H_2$) that is primarily responsible for the observed preservative effects of perishable food.

The details of one or more embodiments of the invention are set forth in the description below. Other features and advantages will be apparent from the following detailed description and the appended claims.

DETAILED DESCRIPTION OF THE INVENTION

All patents and publications referred to herein are incorporated by reference. Unless otherwise defined, all technical and scientific terms used herein have the same meaning as commonly understood to one of ordinary skill in the art to which this invention pertains. Otherwise, certain terms used herein have the meanings as set forth in the specification.

It must be noted that as used herein and in the appended claims, the singular forms "a," "an," and "the" include plural references unless the context clearly dictates otherwise.

The invention relates to electrochemical processes and systems for preserving perishable food. Although it has previously been demonstrated that melanin can catalyze electrolysis of water to generate $H_2$ and $O_2$ outside of a living cell, until now this process has only been shown to occur with melanin submerged in water. However, it is now discovered that melanin can catalyze water electrolysis to generate sufficient amounts of diatomic hydrogen in the presence of water moisture and electromagnetic energy, without the need for the melanin to be submerged in wafer.

Upon the absorption of electromagnetic energy in the presence of water moisture, melanin can initiate the electrolysis of water into diatomic hydrogen and diatomic oxygen, which is thought to produce diatomic hydrogen in amounts sufficient to provide a significant preservative effect to perishable food. Because diatomic hydrogen has a very strong antioxidant effect, diatomic hydrogen is very stable, and there is more diatomic hydrogen produced from the electrolysis reaction, the antioxidant effects of diatomic hydrogen are thought to be greater than the oxidative effects of diatomic oxygen. According to embodiments of the invention, melanin, melanin precursors, melanin derivatives, melanin analogs, or melanin variants can be used to produce diatomic hydrogen from water moisture in the presence of a source of electromagnetic energy, such as invisible or visible light energy, electromagnetic waves, gamma rays, X-rays, ultraviolet radiation, infrared radiation, microwaves, or radio waves.

As used herein, the term "electrolysis of water" refers to a chemical reaction in which the water molecule ($H_2O$) is split into diatomic oxygen ($O_2$) and diatomic hydrogen ($H_2$). According to embodiments of the invention, the electrolysis of water is catalyzed by a water electrolyzing material.

As used herein, "water electrolyzing material" refers to a substance that is capable of catalyzing the electrolysis of water, i.e., splitting the water molecule into oxygen and hydrogen. According to embodiments of the invention, melanin materials including melanin (natural and synthetic), melanin precursors, melanin derivatives, melanin analogs, and melanin variants are water electrolyzing materials.

As used herein, the term "melanin material" refers to melanin, melanin precursors, melanin derivatives, melanin analogs, or melanin variants. Examples of melanin materials include, but are not limited to, natural melanin, synthetic melanin, eumelanin, pheomelanin, neuromelanin, sepiomelanins, and alomelanin; aromatic compounds such as dopamine, indole, polyhydroxyindole, humic acid, polyindolequinones, pyrrole black, indole black, benzene black, thiophene black, aniline black, ommochrome black; polyquinones in hydrated form, dopa black, adrenalin black, catechol black, 4-amine catechol black; precursors of melanin such as phenols, aminophenols, or diphenols, indole polyphenols, quinones, semiquinones or hydroquinones, L-tyrosine, L-dopamine, morpholine, ortho-benzoquinone, dimorpholine, porphyrin black, and pterin black; linear carbon containing compounds such as acetylene black; and carbon building blocks such as fullerenes and graphite.

In a preferred embodiment of the invention, the melanin material is melanin, such as natural or synthetic melanin. "Natural melanin" is intended to refer to melanin that is isolated from a natural source, such as a plant or animal. "Synthetic melanin" is intended to refer to melanin that is chemically synthesized.

As used herein, "moisture" refers to the presence of a liquid in small quantities, such that a humid environment is created. The term "water moisture" specifically refers to the presence of water in a small quantity creating a humid environment. Water moisture can be in the form of water vapor, i.e., water present in the air in a gaseous state. Water moisture can also be in the form of dew. The term "dew" refers to water in the form of droplets on a surface, such as an inner wall of a container, due to condensation. In a preferred embodiment of the invention, the perishable food to be preserved is the source of the water moisture, and water moisture is derived at least partially from the natural release thereof by the perishable food.

Unless otherwise noted, "food spoilage," and "spoil," when used with reference to perishable food, refer to the process by which food deteriorates or decays to a point at which it is no longer edible, or safe for consumption by mammals, and particularly for consumption by humans.

As used herein, the term "perishable food" refers to any food that can decay, spoil or deteriorate to a point at which it is no longer edible, or safe for consumption, by mammals, and particularly for consumption by humans. Perishable food is also a food that typically spoils if it is stored improperly (e.g., at high temperature rather than under refrigeration), or stored for a prolonged period before consumption. A perishable food used in the invention can be any substance produced by the earth suitable for consumption by mammals, or any substance that is prepared for consumption by mammals. The perishable food can be in any physical state, such as liquid, solid, or semi-solid, and is preferably a solid (e.g., cheese) or liquid (e.g., milk).

Perishable food includes, but is not limited to, fruits, vegetables, poultry, meats, fish, and dairy products. Examples of perishable fruits include, but are not limited to, apples, bananas, raspberries, strawberries, blueberries, oranges, grapes, mangos, pineapple, honeydew, cantaloupe, watermelon, pears, kiwi, and blackberries. Examples of perishable vegetables include, but are not limited to, cucumbers, peppers, beans, broccoli, cauliflower, Brussels sprouts, lettuce, spinach, potatoes, tomatoes, and onions. Examples of perishable poultry and meats include, but are not limited to chicken, turkey, beef, and pork products. Examples of perishable fish include, but are not limited to, shellfish, such as shrimp and scallops; salmon; tuna; sea bass; and halibut. Examples of perishable dairy products include, but are not limited to, yogurt, milk, cheeses, and butter.

As used herein, the terms "preserve," "preserving," and "preservation," when used with reference to perishable food, all refer to preventing, reducing, or delaying the onset of food spoilage of the perishable food. According to embodiments of the invention, perishable food can be preserved by preventing, reducing, or delaying the progression of food spoilage that occurs as a result of oxidation. In one embodiment, "preserving" refers to inhibiting oxidation of the perishable food. In another embodiment, "preserving" refers to delaying the onset of oxidation of the perishable food. In yet another embodiment, "preserving" refers to delaying the progression of oxidation of perishable food.

Any method known in the art in view of the present disclosure can be used to determine if food spoilage has been prevented, reduced, or delayed, such as, for example, visual inspection to determine if there is mold or fungal growth on the surface of the food, discoloration (browning), or rotting of the food; sniffing the food to determine if there is an unpleasant odor emanating from the food; or chemical testing to detect the growth of microorganisms that are not visible to the naked eye. The perishable food can be both visually inspected and smelled to determine if food spoilage has been prevented, reduced, or delayed. In a particular embodiment, food spoilage can be assessed by determining the amount of food browning or discoloration, or the rate at which food browns or becomes discolored, which is indicative of oxidation of the perishable food.

In one general aspect, the invention provides an electrochemical process for preserving at least one perishable food. According to embodiments of the invention, an electrochemical process comprises providing a closed container containing water moisture, at least one perishable food, and at least one water electrolyzing device, wherein the at least one water electrolyzing device comprises a substrate and at least one melanin material; providing a source of electromagnetic energy to the at least one water electrolyzing device to initiate a reaction of electrolysis of water by the at least one melanin material; and maintaining the the at least one perishable food and water electrolyzing device inside the closed container, thereby preserving the perishable food.

Diatomic hydrogen ($H_2$), which is an antioxidant, is believed to be produced by the water electrolysis reaction, or splitting of the water molecule, catalyzed by at least one melanin material in the presence of water moisture and a source of electromagnetic energy according to a process of the invention.

In particular embodiments, a process of the invention preserves perishable food by preventing, reducing, or delaying the progression of oxidation of the perishable food.

Any type of electromagnetic energy can be used in a process of the invention including, but not limited to, visible and invisible light, gamma rays, X-rays, ultraviolet radiation, electromagnetic waves, infrared radiation, microwaves, and radio waves. In a preferred embodiment, the electromagnetic energy comprises visible or invisible light energy (ultraviolet and infrared radiation). In a particular embodiment, the visible or invisible light energy has a wavelength between 200 nm and 900 nm.

According to embodiments of the invention, at least one water electrolyzing device is present in a closed container in a process of the invention. The water electrolyzing device is comprised of a substrate and at least one melanin material, such that the melanin material is held on or within the substrate. The melanin material can be dispersed throughout the substrate or adsorbed onto the substrate. Preferably, the substrate is transparent to electromagnetic energy to allow for increased transmission of the electromagnetic energy to the melanin material, resulting in increased electrolysis of water.

A water electrolyzing device can comprise one type of melanin material, or more than one type of melanin material. For example, a water electrolyzing device for use in the invention can comprise melanin and eumelanin. According to another embodiment of the invention, more than one water electrolyzing device can be used, with each device comprising the same or different type of melanin material. For example, a first water electrolyzing device comprising melanin and a second water electrolyzing device comprising eumelanin can both be used in a process for preserving perishable food according to the invention. As another illustrative and non-limiting example, more than one electrolyzing device with each comprising melanin can be used in a process of the invention.

According to embodiments of the invention, the at least one melanin material is selected from the group consisting of melanin, melanin precursors, melanin derivatives, melanin analogs, and melanin variants. In a preferred embodiment, the at least one melanin material is melanin, preferably natural melanin or synthetic melanin. Any method known in the art in view of the present disclosure can be used to obtain a melanin material. For example, melanin materials can be chemically synthesized or isolated from natural sources, such as plants and animals. Melanin can also be synthesized from amino acid precursors of melanin, such as L-tyrosine. The melanin material can also be obtained from commercial sources.

The substrate of the water electrolyzing device can be any inert material, including, but not limited to, silica, plastic, and glass. Preferably, the substrate is silica, such that a water electrolyzing device is a mixture of silica and at least one melanin material. The water electrolyzing device can be, for example, a melanin/silica plate or cube, either of which can be made by combining a cementing mixture of silica with an aqueous melanin solution.

In a preferred embodiment, a water electrolyzing device for use in the invention is melanin (synthetic or natural) mixed with silica. Preferably, the melanin is dispersed in the silica, forming a homogeneous mixture of melanin and silica.

According to embodiments of the invention, the water electrolyzing device can take on any size or shape, including, but not limited to, a rod (cylindrical), plate, sphere, or cube-shape. At least one water electrolyzing device can be used, but the number of water electrolyzing devices, and the size or shape of the water electrolyzing devices, is not limited in any way. The rate of diatomic hydrogen ($H_2$) production will depend upon a variety of factors and can be controlled by varying, for example, the size, shape, surface area, amount of melanin material in the device, and/or number of water electrolyzing devices present in the closed container.

According to embodiments of the invention, the size, shape and number of water electrolyzing devices are selected based on the desired rate and amount of water electrolysis catalyzed by the melanin material. For example, using a larger number of water electrolyzing devices will result in an increased amount of water electrolysis and/or an increased rate of water electrolysis. As another illustrative example, a larger amount of melanin material in the one or more water electrolyzing devices will also result in an increased amount of water electrolysis and/or an increased reate of water electrolysis. It is well within the purview of one of ordinary skill in the art to determine the size and shape of the water electrolyzing device, the number of water electrolyzing devices used, and the specific melanin material and amount of melanin material used in the water electrolyzing device in order to achieve optimal results in preserving perishable food.

In a preferred embodiment of the invention, the water electrolyzing device is in the shape of a cube. In a more preferred embodiment, multiple water electrolyzing devices each in the shape of a cube are used in an electrochemical process of the invention.

The water electrolyzing device can be made by any method known in the art. For example, melanin-silica water electrolyzing devices can be made by combining silica powder, purified water, and melanin in a container made of an inert material. The components are mixed together and the mixture is allowed to harden, such that the hardened mixture takes on the shape of the container. Preferably, melanin is added at a concentration of about 5 g/L of purified water. Water electrolyzing devices can be made in any shape according to this same process by mixing silica powder, water, and melanin in a container having the desired shape, and subsequently allowing the mixture to harden in the container. The silica powder can be substituted by any other inert material in order to produce water electrolyzing devices having a material other than silica as the substrate. In certain embodiments of the invention, the water electrolyzing device is porous to allow for water moisture to come into contact with the melanin material, and for the release of any diatomic hydrogen produced from the water electrolyzing device.

The water electrolyzing devices can be arranged in any way within the closed container. The water electrolyzing devices can contact the perishable food, or they can be placed throughout the container such that they are spaced apart from the perishable food. According to embodiments of the invention, the closer the water electrolyzing devices are placed to the food, the greater the preservative effect observed. If the perishable food is a liquid, the water electrolyzing devices can be added directly into the liquid, or submerged in the liquid. Although the melanin material can be added in either liquid or solid form directly to the perishable food (solid, liquid, or semi-solid/semi-liquid substances), the melanin material would not be easily recoverable from the perishable food prior to consumption. Accordingly, the use of a water electrolyzing device comprising the melanin material allows for the melanin material to remain separated from the perishable food, such that it can easily be removed from the container and reused indefinitely, thus reducing the costs of the process.

According to embodiments of the invention, an electrochemical process is initiated by providing a source of electromagnetic energy to the water electrolyzing device. The melanin material of the water electrolyzing device absorbs the electromagnetic energy, and subsequently catalyzes the electrolysis of water into diatomic hydrogen ($H_2$) and diatomic oxygen ($O_2$). According to embodiments of the invention, water is present in the form of water moisture. Additionally, melanin can have tightly bound water molecules, and it is believed that the associated water content of melanin is at least 40%. Thus, the source of water for the water electrolysis reaction catalyzed by melanin can also be the bound water molecules. Preferably, the water moisture is water that has condensed on the surface of the perishable food, or on one or more of the interior surfaces of the closed container, or both. In a preferred embodiment, the water moisture is naturally released from the perishable food.

According to a particular embodiment of the invention, the electromagnetic energy is either visible or invisible light having a wavelength ranging from 200 nm to 900 nm. In another particular embodiment, the electrochemical process is a photoelectrochemical process, wherein the electromagnetic energy is photoelectric energy, such as visible light energy. In a preferred embodiment, the source of photoelectric energy is natural light.

An electrochemical process for preserving perishable food according to the invention is carried out in a closed container. There are at least two purposes for using a closed container. The first is to prevent the loss of significant water moisture present in the container. The second is to maintain the perishable food in contact with the water electrolyzing device in order to preserve the perishable food. In a preferred embodiment, the closed container has an airtight seal.

A closed container for use in a process of the invention can be any size or shape. The closed container can be made of any suitable material including, but not limited to, plastics, such as polyethylene; glass; and any other materials that allow for the transmission of the desired wavelengths of electromagnetic energy into the closed container, such that the electromagnetic energy can be absorbed by the melanin material in the water electrolyzing device. The material of the closed container is preferably light transparent to allow for the transmission of visible light. The material of the closed container is also preferably substantially impermeable to diatomic hydrogen. The container can have a rigid shape, or it can have a free form shape, such as plastic wrap or a plastic bag.

According to embodiments of the invention, the electrochemical process comprises maintaining the at least one perishable food and water electrolyzing device within the container, thereby preserving the at least one perishable food. The amount of time the perishable food and water electrolyzing device are held within the container can vary depending on various factors such as the perishable food to be preserved, the temperature, the number of water electrolyzing devices in the container, the amount of melanin material in each water electrolyzing device, etc. In a preferred embodiment, the perishable food and water electrolyzing device are held within the container until the perishable food is to be consumed.

An electrochemical process according to the invention can be used to preserve any perishable food in view of the present disclosure, including, but not limited to, fruits, vegetables, meats, poultry, and dairy products. Preferably, the perishable food is a fruit or vegetable, and more preferably, a fruit, such as bananas or apples. The perishable food for use in a process of the invention can be peeled or unpeeled. As an illustrative example, a banana having an intact peel (i.e., unpeeled) can be preserved using an electrochemical process of the invention. As another illustrative example, an apple that has been cut in half, or has its peel partially removed, such that the flesh is exposed (i.e., peeled) can also be preserved using an electrochemical process of the invention.

In one embodiment of the invention, only one perishable food is in the closed container. In another embodiment, more than one perishable food is in the closed container. When more than one perishable food is in the container, the perishable food can be the same or different. For example, multiple apples can be in the same container. As another example, an apple and a banana can be in the same container.

According to embodiments of the invention, the electrochemical process can be initiated prior to the onset of any food spoilage, such as oxidation or discoloration of the perishable food, to prevent spoilage. However, the electrochemical process can also be initiated after the onset of food spoilage to prevent any additional food spoilage, or reduce the rate of continuing food spoilage.

The electrochemical process for preserving perishable food can be performed at any temperature at which melanin is known to be stable (approximately −150° C. to 500° C.). According to a preferred embodiment of the invention, the electrochemical process is performed at a temperature ranging from 0° C. to 50° C., more preferably from 12° C. to 30° C., and most preferably at room temperature (approximately 25° C.). Because melanin can absorb any wavelength of electromagnetic energy and does not necessarily require natural light, the process can also be performed in a refrigerator (about 4° C.). Performing the electrochemical process under refrigeration can have the advantage of preserving the perishable food for an even longer period of time due to the added preservative effects of refrigeration and storage at cooler temperatures.

Many factors will affect the rate and efficiency of an electrochemical process for preserving perishable food according to embodiments of the invention. These factors include, but are not limited to, the amount and particular wavelength of electromagnetic energy supplied to the container; the number of water electrolyzing devices; the amount and type of melanin material in the water electrolyzing device; the amount of electromagnetic energy absorbed by the melanin material; and the amount of water moisture in the container.

According to embodiments of the invention, the water electrolysis reaction of can be catalyzed by at least one melanin material, wherein the at least one melanin material is the only water electrolyzing material used in the process. Thus, in particular embodiments of the invention, the at least one melanin material is the only water electrolyzing material used in an electrochemical process for preserving perishable food. According to a particularly preferred embodiment, melanin (synthetic or natural) is the only water electrolyzing material used in a process for preservation of perishable food.

Another aspect of the invention provides a system for preserving at least one perishable food. A system according to the invention comprises:
  (a) a closed container containing:
    (i) water moisture;
    (ii) at least one water electrolyzing device, wherein the at least one water electrolyzing device comprises a substrate and at least one melanin material selected from the group consisting of melanin, melanin precursors, melanin derivatives, melanin analogs, and melanin variants; and
    (iii) at least one perishable food; and
  (b) a source of electromagnetic energy to irradiate the at least one water electrolyzing device in the container.

According to embodiments of the invention, a closed container of a system contains water moisture, at least one perishable food, and at least one water electrolyzing device. The closed container is sealed, preferably with a gas-tight seal. The closed container can be of any size or shape, and can be made of any suitable material in view of the present disclosure. In a preferred embodiment, the closed container is made of plastic, or other material that is substantially impermeable to $H_2$. Using a container with a gas-tight seal made of a material that is substantially impermeable to $H_2$ will prevent the escape of any diatomic hydrogen that is produced by the electrochemical process, which is thus believed to enhance the preservative effects of the process on the perishable food.

According to embodiments of the invention, a system comprises at least one water electrolyzing device. The water electrolyzing device(s) are held within the container of the system. Any of the water electrolyzing devices described herein can be used. Preferably one or more water electrolyzing devices comprised of a mixture of silica and melanin (natural or synthetic) are used. However, any melanin material, including melanin and its precursors, analogs, derivatives and variants, can be used.

According to embodiments of the invention, the energy provided by the source of electromagnetic energy to the closed container is transmitted through the container, such that it is absorbed by the melanin material of the water electrolyzing device. In a preferred embodiment, the source of electromagnetic energy provides invisible or visible light energy having a wavelength between 200 nm and 900 nm to the closed container.

In a preferred embodiment, the at least one melanin material in the system is melanin (natural or synthetic). In another preferred embodiment, melanin is the only water electrolyzing material present in the system.

Any electrochemical process for preserving perishable food described herein can be performed using a system according to the invention. In a preferred embodiment, the electrochemical process is a photoelectrochemical process with the source of electromagnetic energy being photoelectric energy, preferably visible light energy, and more preferably natural light energy. In another preferred embodiment, water moisture of the system is derived at least partially from the at least one perishable food item, e.g., by natural release of water from the perishable food.

The electrochemical process and system for preserving perishable food according to embodiments of the invention, can be carried out with water moisture, a water electrolyzing device comprising a melanin material, and electromagnetic energy, such as light energy, without the need for any other type of water electrolyzing material. Because melanin is one of the most stable molecules known to man, having a half-life estimated to be on the order of millions of years, the melanin material or water electrolyzing device can be used for decades before it needs to be replaced. Thus, no complex setup or maintenance is required.

The precise mechanism by which melanin, and its precursors, derivatives, analogs, and variants, are able to use electromagnetic energy and catalyze water electrolysis to produce diatomic hydrogen is not yet fully understood. Without wishing to be bound by any theories, it is believed that melanin absorbs the electromagnetic energy, promoting the conversion of low energy electrons to high energy electrons. The high energy electrons are thought to be transferred by mobile electron carriers within the melanin material. This electron transfer releases energy and establishes a proton gradient sufficient to initiate the splitting of water into diatomic hydrogen ($H_2$) and diatomic oxygen ($O_2$) along with the release of four high energy electrons.

The following examples of the invention are to further illustrate the nature of the invention. It should be understood that the following examples do not limit the invention and that the scope of the invention is to be determined by the appended claims.

EXAMPLES

Example 1

Preservation of Apples by an Electrochemical Process of the Invention

Two apples were each halved through their core. The two halves of one apple were wrapped together in transparent plastic foil, with the cut side of the apple facing upward, along with five cubes made of melanin mixed with silica (water electrolyzing device) randomly placed around the apple halves. Each of the melanin/silica cubes had an average size of 1 cm×1 cm×1 cm. The cubes were produced by mixing water, silica powder, and melanin in a container of the same size, and allowing the water/silica/melanin mixture to harden within the container. The two halves of the other apple were wrapped together in transparent plastic foil without any melanin/silica cubes as a control. The plastic-wrapped apples were stored at room temperature (25° C.) and exposed to natural (visible) light for about 5 weeks. The water moisture for the process was the natural moisture produced by the apples from the humidity within the microenvironment of the plastic-wrapped apple. No other water electrolyzing material was wrapped with the apples.

The exposed flesh of the apples exhibited no browning or other discoloration at the start of the experiment, indicating that minimal to no oxidation had occurred. However, after an incubation period of about 5 weeks at room temperature, the exposed flesh of the apples wrapped together in plastic with the melanin/silica cubes showed significantly less browning (oxidation) than the flesh of the apples wrapped in plastic without the melanin/silica cubes. Furthermore, over the course of the incubation period, the rate of browning (discoloration) of the exposed flesh of the apple wrapped with the melanin/silica cubes was slowed as compared to the rate of browning of the exposed flesh of the apple wrapped without the melanin/silica cubes. The results of the above experiment demonstrate that in the presence of water moisture, melanin, and light energy, the flesh of peeled perishable food, such as apples, can be preserved.

Example 2

Preservation of Bananas by an Electrochemical Process of the Invention

Two bananas each with an intact peel were wrapped separately in transparent plastic foil. One banana was wrapped together in the plastic foil with five cubes of silica mixed with melanin (water electrolyzing device) randomly placed around the banana. Each of the melanin/silica cubes had an average size of 1 cm×1 cm×1 cm. The melanin/silica cubes were produced by mixing water, silica powder, and melanin in a container of the same size, and allowing the water/silica/melanin mixture to harden within the container. The other banana was wrapped in transparent plastic foil without any of the melanin/silica cubes as a control. The plastic-wrapped bananas were stored at room temperature (25° C.) and exposed to visible light for about 2 weeks. The water moisture for the process was the natural moisture produced by the bananas from the humidity within the microenvironment of the plastic-wrapped banana. No other water electrolyzing material was wrapped with the bananas.

The outside surface of the banana peels had very few, if any, brown spots (i.e., minimal or no oxidation had occurred) at the start of the experiment. However, after an incubation period of about two weeks at room temperature, the peel of the banana wrapped together in plastic with the melanin/silica cubes was significantly less brown than the peel of the banana wrapped in plastic without the water electrolyzing devices. Furthermore, over the course of the incubation period, the rate of browning (discoloration) of the peel of the banana wrapped with the melanin/silica cubes was slowed as compared to the rate of browning of the peel of the banana wrapped without the melanin/silica cubes.

The results of the above experiment demonstrate that in the presence of water moisture, melanin, and light energy, unpeeled perishable food, such as bananas, can be preserved.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the invention as defined by the appended claims.

I claim:

1. A process for preserving at least one perishable food, the process comprising:

providing a closed container containing water moisture, the at least one perishable food, and at least one device, wherein the at least one device comprises a substrate and melanin, the substrate comprising silica, the at least one device being removable from the container;

providing a source of electromagnetic energy comprising visible or invisible light energy having a wavelength of 200 nm to 900 nm to the at least one device in the container to initiate production of diatomic hydrogen by the melanin of the at least one device; and maintaining the at least one perishable food and the at least one device within the container, such that the at least one perishable food is preserved.

2. The process according to claim 1, wherein the melanin is dispersed in the silica forming a mixture of silica and the melanin.

3. The process according to claim 1, wherein the melanin comprises natural melanin or synthetic melanin.

4. The process according to claim 1, wherein the at least one perishable food is selected from the group consisting of fruits, vegetables, meats, poultry, fish, and dairy products.

5. The process according to claim 1, wherein oxidation of the perishable food is prevented, reduced, or delayed to preserve the perishable food.

6. The process according to claim 1, wherein the closed container is made of a material that is substantially impermeable to $H_2$.

7. A system for preserving at least one perishable food, the system comprising:

(a) a closed container containing:
  (i) water moisture;
  (ii) at least one device comprising a substrate and melanin, the substrate comprising silica; and
  (iii) the least one perishable food; and (b) a source of electromagnetic energy comprising visible or invisible light energy having a wavelength of 200 nm to 900 nm to irradiate the at least one device in the container, wherein the at least one device is removable from the container.

8. The system according to claim 7, wherein the melanin is dispersed in the silica forming a mixture of silica and the melanin.

9. The system according to claim 7, wherein the melanin comprises natural melanin or synthetic melanin.

10. The system according to claim 7, wherein the at least one perishable food is selected from the group consisting of fruits, vegetables, poultry, meats, fish, and dairy products.

11. The system according to claim 7, wherein the water moisture is derived at least partially from natural release by the at least one perishable food.

\* \* \* \* \*